United States Patent
Heeter et al.

(10) Patent No.: US 12,065,979 B2
(45) Date of Patent: Aug. 20, 2024

(54) DISTRIBUTED ELECTRIC AND HYBRID FANS FOR DISTORTION TOLERANCE OF TURBOFAN ENGINES

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Kathryn A. Sontag, Indianapolis, IN (US); Michael G. Meyer, Indianapolis, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 78 days.

(21) Appl. No.: 18/088,974

(22) Filed: Dec. 27, 2022

(65) Prior Publication Data
US 2024/0209795 A1    Jun. 27, 2024

(51) Int. Cl.
*F02C 9/20* (2006.01)
*F02C 3/06* (2006.01)
*F02K 3/04* (2006.01)
*B64D 31/06* (2006.01)

(52) U.S. Cl.
CPC .......... *F02C 9/20* (2013.01); *F02C 3/06* (2013.01); *F02K 3/04* (2013.01); *B64D 31/06* (2013.01); *F05D 2220/32* (2013.01); *F05D 2260/60* (2013.01)

(58) Field of Classification Search
CPC ..... F02C 9/20; F02C 3/06; F02K 3/04; B64D 31/06; F05D 2220/32; F05D 2260/60
See application file for complete search history.

(56) References Cited

U.S. PATENT DOCUMENTS

| | | | |
|---|---|---|---|
| 4,655,413 A | 4/1987 | Genssler et al. | |
| 7,637,455 B2 | 12/2009 | Silkey et al. | |
| 7,926,290 B2 | 4/2011 | Johnson | |
| 7,975,961 B2 | 7/2011 | Silkey et al. | |
| 10,704,418 B2 | 7/2020 | Ramakrishnan et al. | |
| 11,149,639 B2 | 10/2021 | Duge | |
| 11,835,064 B1* | 12/2023 | Heeter | F04D 25/06 |
| 2016/0076444 A1* | 3/2016 | Bailey Noval | F02C 3/107 |
| | | | 415/68 |
| 2019/0138663 A1 | 5/2019 | Ferrar et al. | |

FOREIGN PATENT DOCUMENTS

| | | |
|---|---|---|
| CN | 106441789 | 2/2017 |
| WO | 2020113110 | 6/2020 |

OTHER PUBLICATIONS

Justin M. Bailey, The Influence of Development and Fan/Screen Interaction on Screen-Generated Total Pressure Distortion Profiles, Dec. 5, 2013.
Aaron Drake et al., Environmentally Responsible Aviation N+2 Advanced Vehicle Study: Final Technical Report, Apr. 30, 2013.

* cited by examiner

*Primary Examiner* — Steven M Sutherland
(74) *Attorney, Agent, or Firm* — Barnes & Thornburg LLP (57) ABSTRACT

A gas turbine engine comprises a primary fan and an engine core. The primary fan is mounted for rotation about an axis of the gas turbine engine to provide thrust. The engine core is coupled to the primary fan and configured to drive the primary fan about the axis to cause the fan to push air to provide thrust for the gas turbine engine.

20 Claims, 6 Drawing Sheets

DISTRIBUTED ELECTRIC AND HYBRID FANS FOR DISTORTION TOLERANCE OF TURBOFAN ENGINES

STATEMENT REGARDING FEDERALLY SPONSORED RESEARCH OR DEVELOPMENT

Embodiments of the present disclosure were made with government support under Contract No. FA8650-19-D-2063. The government may have certain rights.

FIELD OF THE DISCLOSURE

The present disclosure relates generally to gas turbine engines, and more specifically to distortion mitigation in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce pressure and swirl distortions.

SUMMARY

The present disclosure may comprise one or more of the following features and combinations thereof.

A gas turbine engine may include a primary fan, an engine core, and an auxiliary fan system. The primary fan may be mounted for rotation about an axis of the gas turbine engine to provide thrust. The engine core may be coupled to the primary fan and configured to drive the primary fan about the axis to cause the primary fan to push air to provide thrust for the gas turbine engine. The auxiliary fan system may be configured to augment the flow of air through the gas turbine engine to help offset and minimize the pressure and swirl distortions in the gas turbine engine.

In some embodiments, the primary fan may include a fan rotor, a plurality of fan blades, and an outer case. The plurality of fan blades may extend radially outward from the fan rotor. The outer case may extend circumferentially around the axis of the gas turbine engine radially outward of the plurality of fan blades to define a portion of a flow path of the gas turbine engine.

In some embodiments, the engine core may include a compressor, a combustor, and a turbine. The compressor may be configured to rotate about the axis of the gas turbine engine to compress the air that flows from the primary fan. The combustor may be configured to receive the compressed air from the compressor. The turbine may be coupled to the compressor and the primary fan. The turbine may be configured to rotate about the axis of the gas turbine engine in response to receiving hot, high-pressure products of the combustor to drive rotation of the compressor and the primary fan.

In some embodiments, the auxiliary fan system may include an auxiliary fan array and a control unit. The auxiliary fan array may be located radially inward of the outer case and located axially forward or aft of the primary fan. The control unit may be coupled to the auxiliary fan array.

In some embodiments, the auxiliary fan array may have a plurality of electric fans spaced apart around the axis of the gas turbine engine that are each configured to rotate about a fan axis. The control unit may be configured to vary individually a rotation speed of each electric fan included in the auxiliary fan array in response to a pressure differential in the flow path of the gas turbine engine upstream of the engine core to minimize pressure and swirl distortions in the gas turbine engine.

In some embodiments, the control unit may include a plurality of sensors and a controller. The plurality of sensors may be arranged to measure pressure within the flow path of the gas turbine engine upstream of the engine core. The controller may be coupled to the plurality of sensors to receive pressure measurements from the plurality of sensors.

In some embodiments, the controller may be configured to increase the rotation speed of at least one electric fan included in the auxiliary fan array in response to the pressure measurement being above a predetermined threshold. In some embodiments, the controller may be configured to decrease the rotation speed of at least one electric fan included in the auxiliary fan array in response to the pressure measurement being below the predetermined threshold.

In some embodiments, the control unit may further include a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory and direct the auxiliary fan array to change to the corresponding predetermined speed profile in response to detecting the preprogrammed aircraft maneuver.

In some embodiments, the plurality of electric fans may each be configured to pivot relative to the outer case of the primary fan. The controller may be configured to direct at least one electric fan included in the plurality of electric fans to pivot in response to the pressure measurements from the plurality of sensors.

In some embodiments, the control unit may include a controller and a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory. The controller may be configured to direct the auxiliary fan array to change to the corresponding predetermined speed profile in response to detecting the preprogrammed aircraft maneuver.

In some embodiments, the plurality of electric fans may each be configured to pivot relative to the outer case of the primary fan. The controller may be configured to direct at least one electric fan included in the plurality of electric fans to pivot in response to detecting the preprogrammed aircraft maneuver.

In some embodiments, the gas turbine engine may further include a plurality of struts. The plurality of struts may each extend between the outer case of the primary fan and the engine core. The plurality of struts may be spaced apart circumferentially around the axis. The auxiliary fan array may be located axially aft of the primary fan and two or more electric fans included in the auxiliary fan array are arranged circumferentially between adjacent struts.

In some embodiments, the auxiliary fan array may be located axially aft of the struts. In some embodiments, the plurality of electric fans included in the auxiliary fan array may be arranged around the engine core so that each electric fan included in the plurality of electric fans is located radially between the outer case and the engine core.

According to another aspect of the present disclosure, a gas turbine engine may include a primary fan, an engine core, and an auxiliary fan system. The primary fan may be mounted for rotation about an axis of the gas turbine engine to provide thrust. The engine core may be coupled to the primary fan and configured to drive the primary fan about the axis.

In some embodiments, the auxiliary fan system may include an auxiliary fan array and a control unit. The auxiliary fan array may be located axially forward or aft of the primary fan. The control unit may be coupled to the auxiliary fan array.

In some embodiments, the auxiliary fan array may have a plurality of electric fans spaced apart around the axis of the gas turbine engine that are each configured to rotate about a fan axis. The control unit may be configured to vary individually a rotation speed of each electric fan included in the auxiliary fan array in response to a pressure differential in a flow path of the gas turbine engine upstream of the engine core.

In some embodiments, the control unit may include a plurality of sensors and a controller. The plurality of sensors may be arranged to measure pressure within the flow path of the gas turbine engine upstream of the engine core. The controller may be coupled to the plurality of sensors to receive pressure measurements from the plurality of sensors, In some embodiments, the controller may be configured to increase the rotation speed of at least one electric fan included in the auxiliary fan array in response to the pressure measurement being above a predetermined threshold. The controller may be configured to decrease the rotation speed of at least one electric fan included in the auxiliary fan array in response to the pressure measurement being below the predetermined threshold.

In some embodiments, the plurality of electric fans may each be configured to pivot relative to the primary fan. The controller may be configured to direct at least one electric fan included in the plurality of electric fans to pivot in response to the pressure measurements from the plurality of sensors.

In some embodiments, the control unit may include a controller and a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory. The controller may be configured to direct the auxiliary fan array to change to the corresponding predetermined speed profile in response to detecting the preprogrammed aircraft maneuver.

In some embodiments, the plurality of electric fans may each be configured to pivot relative to the primary fan. The controller may be configured to direct at least one electric fan included in the plurality of electric fans to pivot in response to detecting the preprogrammed aircraft maneuver.

In some embodiments, the gas turbine engine may further include an outer case and a plurality of struts. The outer case may be arranged to extend around the primary fan, the engine core, and the auxiliary fan array. The plurality of struts may each extend between the outer case and the engine core and are spaced apart circumferentially around the axis.

In some embodiments, the auxiliary fan array may be located axially aft of the primary fan. Two or more electric fans included in the auxiliary fan array may be arranged circumferentially between adjacent struts.

In some embodiments, the auxiliary fan array may be located axially aft of the struts. In some embodiments, the plurality of electric fans included in the auxiliary fan array may be arranged around the engine core axially aft of an inlet to the engine core.

According to another aspect of the present disclosure, a method may include providing a gas turbine engine. The gas turbine engine may include a primary fan mounted for rotation about an axis to provide thrust, an engine core coupled to the primary fan and configured to drive the primary fan about the axis, and an auxiliary fan system. The auxiliary fan system may include an auxiliary fan array located axially forward or aft of the primary fan having a plurality of electric fans spaced apart around the axis that are each configured to rotate about a fan axis.

In some embodiments, the method may further include conducting a flow of air through a flow path of the gas turbine engine, measuring pressure of the flow of air in the flow path of the gas turbine engine axially forward of the engine core, and varying a rotation speed of at least one electric fan included in the auxiliary fan array. The rotation speed of the electric fans included in the auxiliary fan array may be varied in response to the pressure measurements being above or below a predetermined threshold to minimize pressure and swirl distortions in the gas turbine engine.

In some embodiments, the method may further include pivoting at least one electric fan included in the auxiliary fan array relative to the primary fan. The at least one electric fan may be pivoted to change a direction of the at least one electric fan in response to the pressure measurements.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
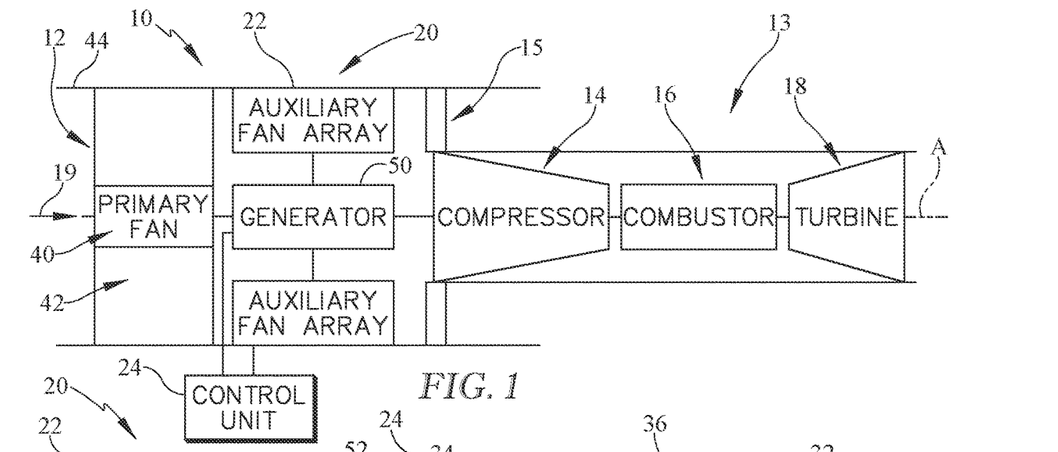
FIG. 1 is a diagrammatic view of a gas turbine engine that includes a primary fan mounted for rotation about an axis of the gas turbine engine to provide thrust, an engine core coupled to the primary fan and configured to drive the primary fan about the axis to cause the fan to push air to provide thrust for the gas turbine engine, and an auxiliary fan system including an auxiliary fan array located axially aft of the primary fan that is configured to augment the flow of air through the gas turbine engine to help offset and minimize the pressure and swirl distortions in the gas turbine engine.
Figure 2:
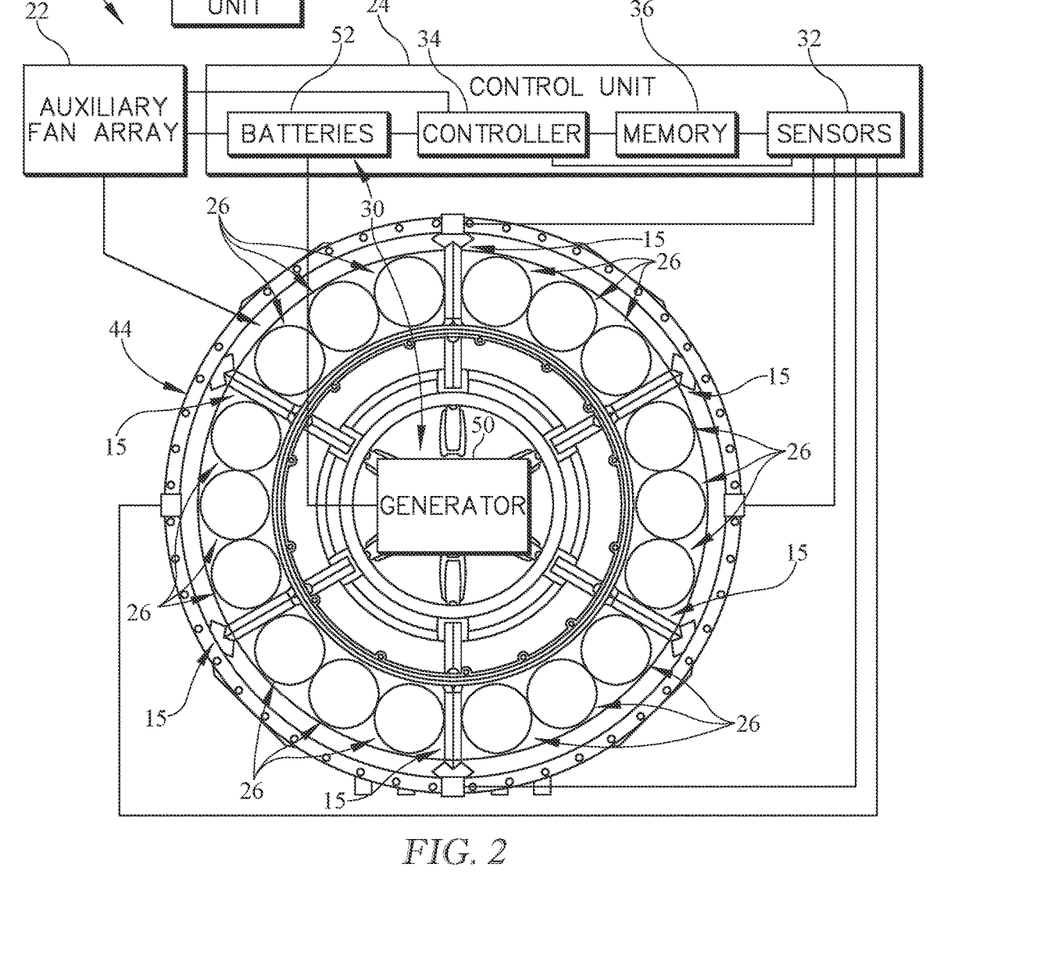
FIG. 2 is a diagrammatic and cross-section view of the gas turbine engine of FIG. 1 showing the auxiliary fan system includes the auxiliary fan array having a plurality of electric fans spaced apart around the axis of the gas turbine engine and a control unit coupled to the auxiliary fan array to individually control the rotation speed of each electric fan included in the auxiliary fan array in response to a pressure differential in the flow path of the gas turbine engine upstream of the engine core.
Figure 3:
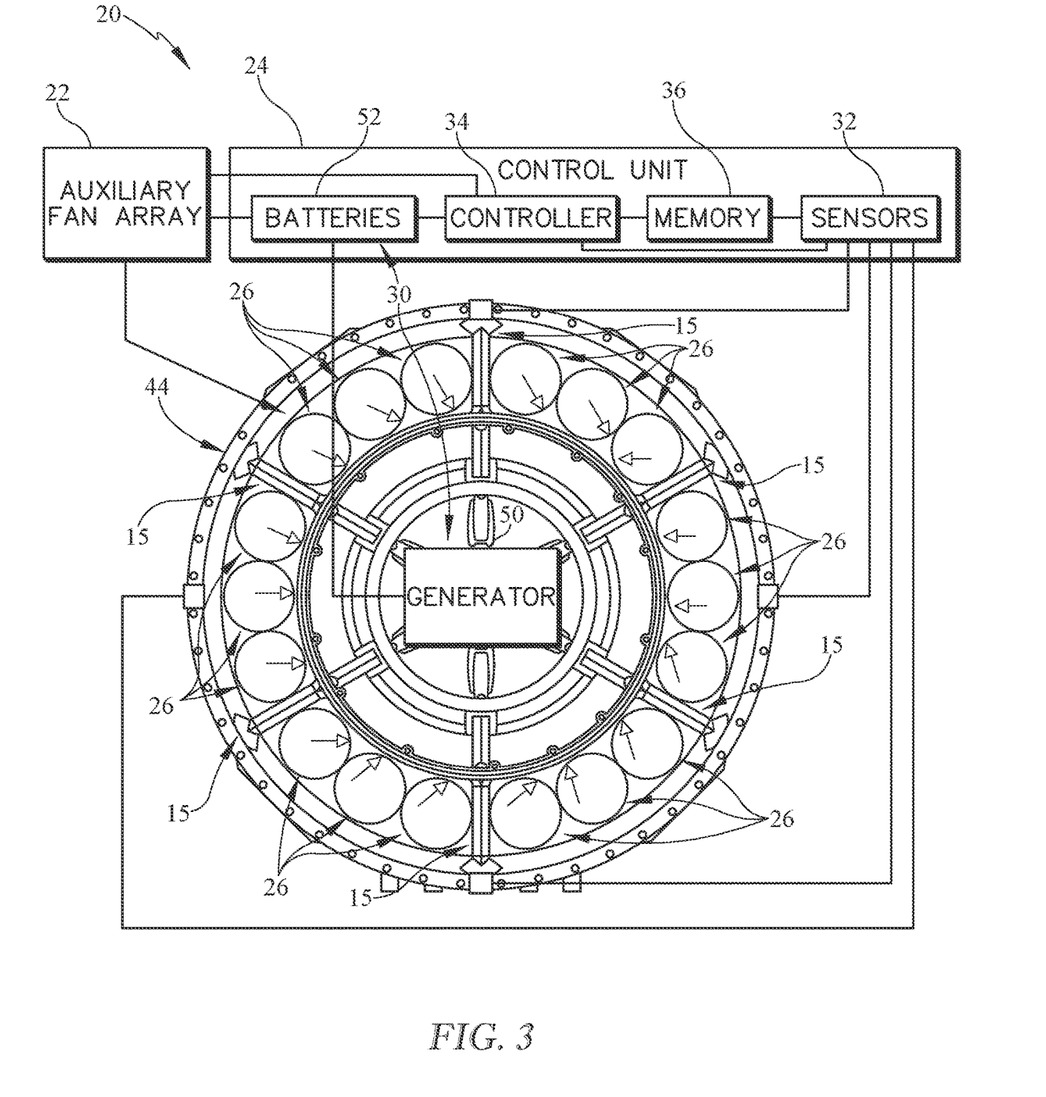
FIG. 3 is view similar to FIG. 2 showing the plurality of electric fans included in the auxiliary fan array are each configured to pivot relative to an outer case of the primary fan so as to change the direction the fan is facing to help mitigate swirl or allow for more active tailoring of distortion response.

An illustrative aerospace gas turbine engine 10 includes a primary fan 12, an engine core 13, and an auxiliary fan system 20 as shown in FIGS. 1-3. The primary fan 12 is mounted for rotation about an axis A of the gas turbine engine 10 to provide thrust. The engine core 13 is coupled to the primary fan 12 and configured to drive rotation of the primary fan 12 about the axis to cause the fan 12 to push air to provide thrust for the gas turbine engine 10. The auxiliary fan system 20 includes an auxiliary fan array 22 located axially aft of the primary fan 12 that is configured to augment the flow of air through the gas turbine engine 10 to help offset and minimize the pressure and swirl distortions in the gas turbine engine 10.

The auxiliary fan system 20 includes the auxiliary fan array 22 and a control unit 24 as shown in FIGS. 1-3. The auxiliary fan array 22 has a plurality of electric fans 26 spaced apart around the axis A of the gas turbine engine 10. The control unit 24 is coupled to the auxiliary fan array 22 to individually control the rotation speed of each electric fan 26 included in the auxiliary fan array 22 in response to a pressure differential in a flow path 19 of the gas turbine engine 10 upstream of the engine core 13.

Embedded engines on an aircraft may experience high distortion in the form of pressure gradients and swirl. The pressure and swirl distortions may cause engine stall or other undesirable aeromechanical behavior. Therefore, the gas turbine engine 10 includes the auxiliary fan system 20 with a plurality of electric fans 26 which allow for individual control of various flows around the circumference of the gas turbine engine 10. By varying the speeds of the different electric fans around the circumference of the engine 10, a circumferentially varying flow environment is stablished to offset or otherwise mitigate the inlet pressure and swirl distortions.

As shown in FIGS. 4-11, the auxiliary fan array may be located in different positions along the axis A of the gas turbine engine 10. In the illustrative embodiment, the auxiliary fan array 22 is located axially aft of the primary fan 12 and axially forward of the engine core 13 as shown in FIG. 1. The electric fans 26 are spaced apart circumferentially about the axis A.

The control unit 24 includes a power supply 30, sensors 32, a controller 34 including a processor, and a memory 36 as shown in FIGS. 2 and 3. The power supply 30 is coupled to each of the electric fans 26 to provide power to each of the electric fans 26. The plurality of sensors 32 arranged to measure pressure within the flow path 19 of the gas turbine engine 10 upstream of the engine core 13. The controller 34 is coupled to each of the electric fans 26 and the power supply 30. The controller 34 is also coupled to the plurality of sensors 32 to receive pressure measurements from the plurality of sensors 32. The memory 36 is coupled to the controller 34 and has a plurality of preprogrammed aircraft maneuvers that each correspond to a predetermined speed profile for the auxiliary fan array 22.

Based on the pressure measurements and/or the detected preprogrammed aircraft maneuvers, the controller 34 is configured to individually increase, decrease, and/or maintain the speed of each of the electric fans 26. The controller 34 is configured to increase the rotation speed of at least one electric fan 26 included in the auxiliary fan array 22 in response to the pressure measurement from the sensors 32 being above a predetermined threshold. The controller 34 is configured to decrease the rotation speed of at least one electric fan 26 included in the auxiliary fan array 22 in response to the pressure measurement being below the predetermined threshold.

The controller 34 may also be configured to maintain the rotation speed of at least one electric fan 26 included in the auxiliary fan array 22 if the pressure measurements are within the predetermined threshold. Alternatively, the controller 34 may be configured to stop rotation of at least one electric fan 26 included in the auxiliary fan array 22 if the pressure measurements are within the predetermined threshold.

In the illustrative embodiment, the controller 34 is configured to increase the rotation speed of the electric fan or fans 26 included in the auxiliary fan array 22 at or near the area of the flow path 19 where the pressure measurement from the sensors 32 is above a predetermined threshold. Similarly, the controller 34 is configured to decrease the rotation speed of the electric fan or fans 26 included in the auxiliary fan array 22 at or near the area of the flow path 19 where the pressure measurement from the sensors 32 is below a predetermined threshold.

For instance, the controller 34 may direct electric fans 26 at one location around the circumference of the engine 10 to increase rotation speed, while also directing other electric fans 26 included in the auxiliary fan array 22 at another location to decrease in rotation speed. Whether the speed of each of the electric fans 26 is increased, decreased, and/or maintained depends on the pressure gradient in the flow path 19 of the engine 10. In areas of high pressure, the rotation speed of the fans 26 is increased. In areas of low pressure, the rotation speed of the fans 26 is decreased. In areas where the pressure is within the desired threshold, the speed of the fans 26 may be maintained.

The controller 34 is also configured to maintain demanded thrust for the engine 10. Therefore, the controller 34 is configured to vary the rotation speed of the fans 26 to adjust the pressure while still meeting the overall thrust needed for the engine 10. Therefore, mitigation speeds may be relative to the overall distribution of pressure.

The controller 34 is also configured to detect a preprogrammed aircraft maneuver included in the plurality of preprogrammed aircraft maneuvers on the memory 36. The controller 34 is configured to direct the auxiliary fan array 22 to change to the corresponding predetermined speed profile in response to detecting the preprogrammed aircraft maneuver.

The predetermined speed profile includes a preset speed and position for each of the fans 26 included in the auxiliary fan array 22. For example, based on the preprogrammed aircraft maneuver, i.e. banks, turns, rolls, etc., the pressure gradient experienced by the gas turbine engine 10 can be predicted such that the rotation speed of the fans 26 can be altered preemptively to minimize the distortions. The speed and position of each fan 26 creates the predetermined speed profile that corresponds to the aircraft maneuver so that whenever the controller 34 detects the preprogrammed aircraft maneuver, the controller 34 directs the auxiliary fan array 22 to the corresponding predetermined speed profile to counter the predicted pressure distortions that will result from the aircraft maneuver.

In some embodiments, other sensors on the aircraft may detect different orientations of the aircraft that correspond to one of the preprogrammed aircraft maneuvers and provide the information to the controller 34. The controller 34 is configured to direct the auxiliary fan array 22 to change to the corresponding predetermined speed profile in response to the other sensor detecting the preprogrammed aircraft maneuver. In the illustrative embodiment, the controller 34 may be configured to use a combination of the pressure measurements and the detected preprogrammed aircraft maneuver to control the rotation speeds of each of the electric fans 26.

In the illustrative embodiment, the plurality of electric fans 26 are each configured to pivot relative to an outer case 44 of the primary fan 12 as suggested in FIG. 3. The controller 34 is configured to direct at least one of the electric fans 26 to pivot in response to the pressure measurements from the plurality of sensors 32 and/or the detected preprogrammed aircraft maneuver. The pivoting the fans 26 may be included in the configuration of the corresponding predetermined speed profile.

Each of the electric fans 26 included in the auxiliary fan array 22 may include a holder and an actuator (not shown). The holder allows the fan 26 to be pivoted relative to the outer case 44. The actuator is coupled to the controller 34. The controller 34 is configured to direct the actuator to pivot the fan 26 so as to change the direction the fan 26 is facing as suggested in FIG. 3. Altering the direction of the fans 26 may help mitigate swirl or allow for more active tailoring of distortion response.

Turning again to the gas turbine engine 10, the gas turbine engine 10 includes the primary fan 12, the engine core 13, a plurality of struts 15, and the auxiliary fan system 20 as shown in FIGS. 1-3. The plurality of struts 15 may be outlet guide vanes that each extend between the outer case of the primary fan 12 and the engine core 13. The struts 15 are spaced apart circumferentially around the axis A.

In the illustrative embodiment, two or more electric fans 26 included in the auxiliary fan array 22 are arranged circumferentially between adjacent struts 15. In the illustrative embodiment, three electric fans 26 are arranged circumferentially between adjacent struts 15.

Turning again to the primary fan 12, the primary fan 12 includes a fan rotor 40, a plurality of fan blades 42, and the outer case 44 as shown in FIG. 1. The plurality of fan blades 42 each extend radially outward from the fan rotor 40. The outer case 44 extends circumferentially around the axis A of the gas turbine engine 10 radially outward of the fan blades 42 to define a portion of the flow path 19 of the gas turbine engine 10. In the illustrative embodiment, the engine core 13 is arranged radially inward of the outer case 44 to create a bypass duct between the outer case 44 and the engine core 13 as shown in FIG. 1.

The engine core 13 includes a compressor 14, a combustor 16, and a turbine 18 as shown in FIG. 1. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14 and the primary fan 12. The primary fan 12 is driven by the turbine 18 and provides thrust for propelling an air vehicle.

The auxiliary fan system 20 includes the auxiliary fan array 22 and the control unit 24 as shown in FIGS. 1-3. The auxiliary fan array 22 includes the plurality of electric fans 26. In the illustrative embodiment, the electric fans 26 are spaced apart circumferentially around the axis A so that two or more electric fans 26 are arranged circumferentially between adjacent struts 15 as shown in FIGS. 2 and 3. The auxiliary fan array 22 is located axially aft of the primary fan 12 and axially forward of the struts 15 in the illustrative embodiment. In other embodiments, the auxiliary fan array 22 may be aligned with the struts 15 so that two or more fans 26 are circumferentially between adjacent struts 15.

The control unit 24 is coupled to the auxiliary fan array 22 to individually control the rotation speed of each electric fan 26 included in the auxiliary fan array 22. The control unit 24 includes the power supply 30, the sensors 32, the controller 34, and the memory 36 as shown in FIGS. 2 and 3.

The power supply 30 can be any suitable source of power or electricity. In the illustrative embodiment, the power supply 30 includes a generator 50 and batteries 52 as shown in FIGS. 2 and 3. The generator 50 is embedded in the gas turbine engine 10 and coupled to the engine core 13 to produce electricity during use of the engine core 13 in the illustrative embodiment. The generator 50 is coupled to the auxiliary fan array 22 to supply power to the auxiliary fan array 22 to drive rotation of the plurality of electric fans 26. The batteries 52 are coupled to the generator 50 to store electricity produced by the generator 50. The batteries 52 are also coupled to the auxiliary fan array 22 to supply power to the auxiliary fan array 22.

In the illustrative embodiment, the generator 50 may be coupled to a second engine core or small turboshaft. In the illustrative embodiment, additional generators 50 may be included in the aircraft to power the auxiliary fan system 20.

In the illustrative embodiment, the batteries 52 may supplement the power supplied by the generator 50 to the fan array 22. The batteries 52 may supply power to the auxiliary fan array 22 during takeoff of the aircraft and/or other higher demand conditions. In some embodiments, the batteries 52 may supply power to the auxiliary fan array 22 during cruise conditions or low demand conditions. In the illustrative embodiment, the batteries 52 are charged during cruise or low demand conditions.

In the illustrative embodiment, the sensors 32 are spaced apart around the circumference of the outer case 44 as suggested in FIGS. 2 and 3. The sensors 32 measure pressure gradients within the flow path 19. In other embodiments, the sensors 32 may measure other characteristics of the flow of air through the flow path 19.

Based on the measurements from the sensors 32 and/or the detected preprogrammed aircraft maneuvers detected, the controller 34 is configured to individually vary the speed of each of the electric fans 26. The controller 34 is configured to increase the rotation speed of at least one electric fan 26 included in the auxiliary fan array 22 in response to the pressure measurement from the sensors 32 being above a predetermined threshold. The controller 34 is configured to decrease the rotation speed of at least one electric fan 26 included in the auxiliary fan array 22 in response to the pressure measurement being below the predetermined threshold.

The controller 34 may also be configured to maintain the rotation speed of at least one electric fan 26 included in the auxiliary fan array 22 if the pressure measurements are within the predetermined threshold. Alternatively, the controller 34 may be configured to stop rotation of at least one electric fan 26 included in the auxiliary fan array 22 if the pressure measurements are within the predetermined threshold.

The controller 34 is also configured to detect a preprogrammed aircraft maneuver included in the plurality of preprogrammed aircraft maneuvers on the memory 36. In some embodiments, other sensors on the aircraft may detect different orientations of the aircraft that correspond to one of the maneuvers In the illustrative embodiment, the plurality of electric fans 26 are each configured to pivot relative to an outer case of the primary fan 12 as suggested in FIG. 3. The controller 34 is configured to direct at least one of the electric fans 26 to pivot in response to the pressure measurements from the plurality of sensors. In the illustrative embodiment, the arrows from each fan 26 in FIG. 3 shows the different flow direction of each fan 26.

In the illustrative embodiment, each electric fan 26 in the auxiliary fan array 22 may be set to a different rotation speed during use of the gas turbine engine 10 based on the measurements from the sensors 32 and/or the detected preprogrammed aircraft maneuvers. Additionally, each electric fan 26 may be set at a different direction based on the measurements from the sensors 32 and/or the detected preprogrammed aircraft maneuvers.

A method of operating the auxiliary fan system 20 during operation of the gas turbine engine 10 includes several steps. During operation of the gas turbine engine, a flow of air is conducted through the engine 10. The primary fan 12 pushes the air axially aft to provide thrust. The flow of air then enters through an inlet of the engine core 13, where the compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14 and the primary fan 12.

As the flow of air is conducted through the engine 10, the pressure sensors 32 measure the pressure within the flow path 19 axially forward or upstream of the engine core 13. Based on the pressure measurements being above, below, or within the predetermined threshold, the controller 34 directs the electric fans 26 of the auxiliary fan array 22 to increase, decrease, or maintain rotation speed.

The controller 34 is configured to increase the rotation speed of at least one electric fan 26 included in the auxiliary fan array 22 in response to the pressure measurement from the sensors 32 being above a predetermined threshold. The controller 34 is configured to decrease the rotation speed of at least one electric fan 26 included in the auxiliary fan array 22 in response to the pressure measurement being below the predetermined threshold. The controller 34 is also configured to maintain the rotation speed of at least one electric fan 26 included in the auxiliary fan array 22 if the pressure measurements are within the predetermined threshold.

Alternatively, or in combination with the pressure measurements, the controller 34 is configured to vary the rotation speed of the electric fans 26 in response to detecting a preprogrammed aircraft maneuver included in the plurality of preprogrammed aircraft maneuvers on the memory 36. The controller 34 is configured to direct the auxiliary fan array 22 to change to the corresponding predetermined speed profile in response to detecting the preprogrammed aircraft maneuver.

Alternatively, or in combination with the other control parameters, the method includes pivoting at least one electric fan included in the auxiliary fan array relative to the primary fan to change the direction of the at least one electric fan in response to the pressure measurements and/or the detected preprogrammed aircraft maneuver. The pivoting the fans 26 may be included in the configuration of the corresponding predetermined speed profile. The controller 34 is configured to direct at least one of the electric fans 26 to pivot in response to the pressure measurements from the plurality of sensors 32 and/or the detected preprogrammed aircraft maneuver.

Figure 4:
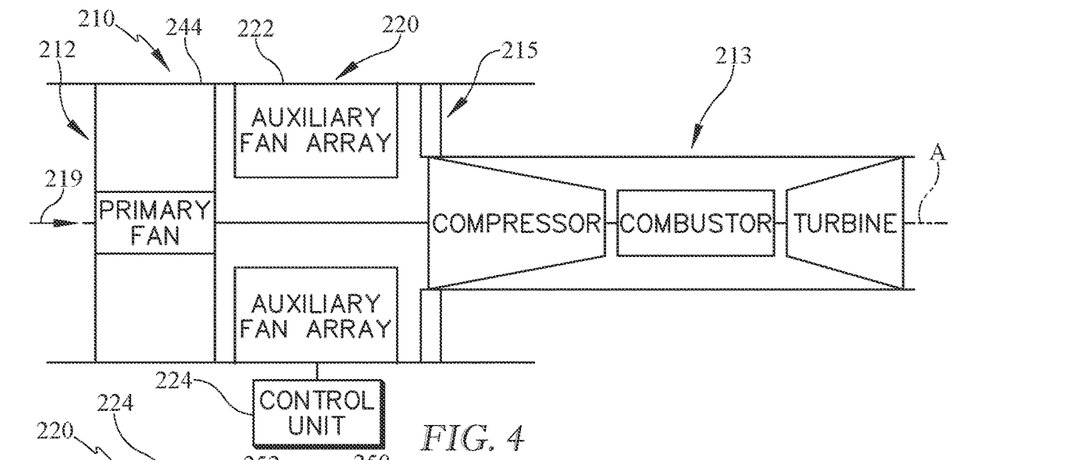
FIG. 4 is a diagrammatic view of another embodiment of an auxiliary fan system included in a gas turbine engine showing the auxiliary fan system having an auxiliary fan array located axially aft of the primary fan and a control unit coupled to the auxiliary fan array to individually control the rotation speed of each electric fan included in the auxiliary fan array.
Figure 5:
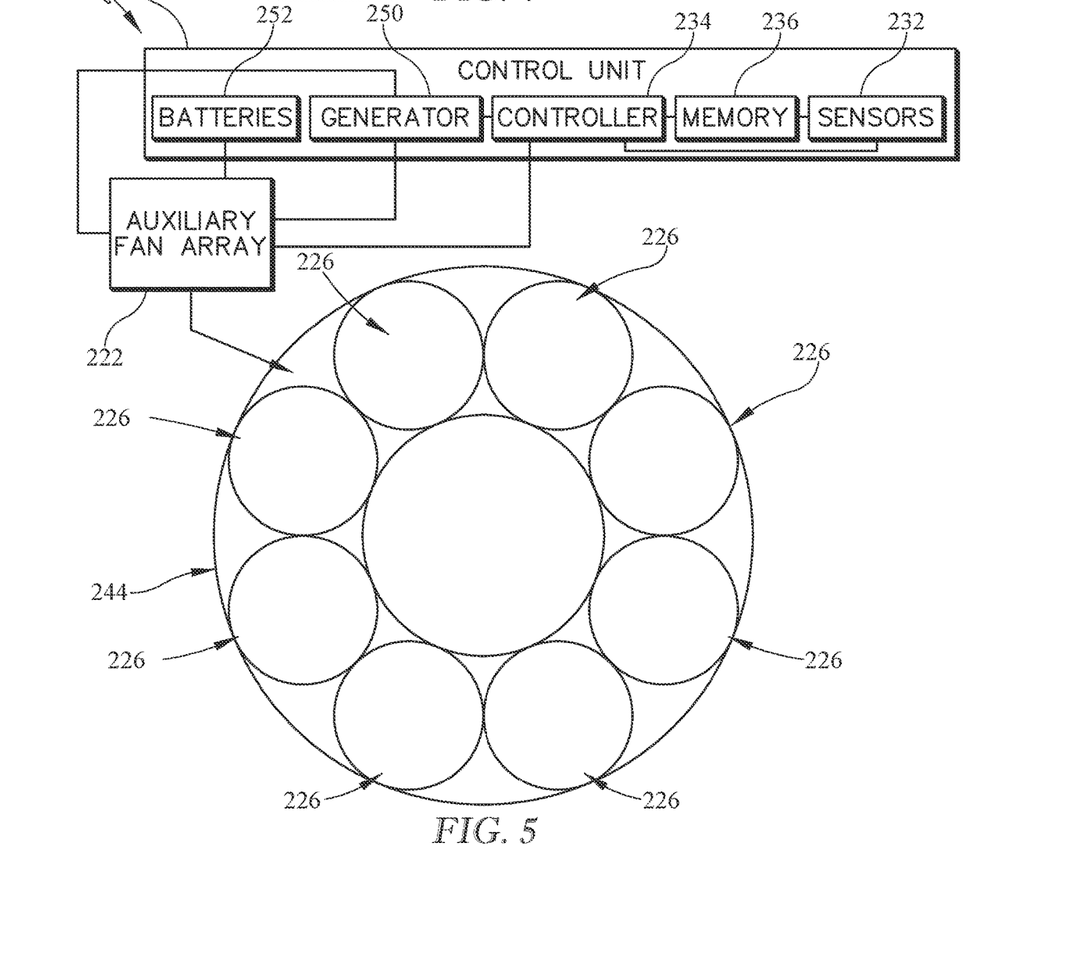
FIG. 5 is a diagrammatic and cross-section view of the gas turbine engine of FIG. 4 showing the auxiliary fan array has a plurality of electric fans spaced apart around the axis of the gas turbine engine that are larger in diameter than the electric fans as shown in FIG. 3.

Another embodiment of an auxiliary fan system 220 in accordance with the present disclosure is shown in FIGS. 4 and 5. The auxiliary fan system 220 is substantially similar to the auxiliary fan system 20 shown in FIGS. 1-3 and described herein. Accordingly, similar reference numbers in the 200 series indicate features that are common between the auxiliary fan system 20 and the auxiliary fan system 220. The description of the auxiliary fan system 20 is incorporated by reference to apply to the auxiliary fan system 20, except in instances when it conflicts with the specific description and the drawings of the auxiliary fan system 220.

The auxiliary fan system 220 is included in a gas turbine engine 210 as shown in FIG. 4. The gas turbine engine 210 includes a primary fan 212, an engine core 213, and the auxiliary fan system 220. The primary fan 212 is mounted for rotation about an axis A of the gas turbine engine 210 to provide thrust. The engine core 213 is coupled to the primary fan 212 and configured to drive rotation of the primary fan 212 about the axis A to cause the fan 212 to push air to provide thrust for the gas turbine engine 210. The auxiliary fan system 220 is configured to augment the flow of air through the gas turbine engine 210 to help offset and minimize the pressure and swirl distortions in the gas turbine engine 210.

The auxiliary fan system 220 includes an auxiliary fan array 222 and a control unit 224 as shown in FIGS. 4 and 5. The auxiliary fan array 222 is located axially aft of the primary fan 212 and axially forward of the struts 215. The auxiliary fan array 222 has a plurality of electric fans 226 spaced apart circumferentially around the axis A of the gas turbine engine 210. The control unit 224 is coupled to the auxiliary fan array 222 to individually control the rotation speed of each electric fan 226 included in the auxiliary fan array 222 in response to a pressure differential in the flow path 19 of the gas turbine engine 210 upstream of the engine core 213.

The electric fans 226 are larger than the fans 26 in the embodiment of FIGS. 1-3 and there are fewer electric fans 226. In the illustrative embodiment, there are eight electric fans 226 spaced apart around the axis A of the gas turbine engine 210. In the illustrative embodiment, the engine core 213 is arranged radially inward of the outer case 244 to create a bypass duct between the outer case 244 and the engine core 213 as shown in FIG. 4.

The control unit 224 includes a power supply, sensors 232, a controller 234, and a memory 236 as shown in FIG. 5. The power supply is coupled to each of the electric fans 226 6 to provide power to each of the electric fans 226. The plurality of sensors 232 arranged to measure pressure within the flow path 219 of the gas turbine engine 210 upstream of the engine core 213. The controller 234 is coupled to each of the electric fans 226 and the power supply. The controller 234 is also coupled to the plurality of sensors 232 to receive pressure measurements from the plurality of sensors 232. The memory 236 is coupled to the controller 234 and has a plurality of preprogrammed aircraft maneuvers that each correspond to a predetermined speed profile for the auxiliary fan array 222.

The power supply includes a generator 250 and batteries 252 as shown in FIG. 5. The generator 250 is coupled to the auxiliary fan array 222 to supply power to the auxiliary fan array 222 to drive rotation of the plurality of electric fans 226. The batteries 252 are coupled to the generator 250 to store electricity produced by the generator 250. The batteries 252 are also coupled to the auxiliary fan array 222 to supply power to the auxiliary fan array 222. In the illustrative embodiment, the batteries 252 may supplement the power supplied by the generator 250 to the auxiliary fan array 222 and/or independently supply power to the auxiliary fan array 222.

Based on the pressure measurements and/or the detected preprogrammed aircraft maneuvers, the controller 234 is configured to individually increase, decrease, and/or maintain the speed of each of the electric fans 226. The controller 234 is configured to increase the rotation speed of at least one electric fan 226 included in the auxiliary fan array 222 in response to the pressure measurement from the sensors 232 being above a predetermined threshold. The controller 234 is configured to decrease the rotation speed of at least one electric fan 226 included in the auxiliary fan array 222 in response to the pressure measurement being below the predetermined threshold.

The controller 234 may also be configured to maintain the rotation speed of at least one electric fan 226 included in the auxiliary fan array 222 if the pressure measurements are within the predetermined threshold. Alternatively, the controller 234 may be configured to stop rotation of at least one electric fan 226 included in the auxiliary fan array 222 if the pressure measurements are within the predetermined threshold.

The controller 234 is also configured to detect a preprogrammed aircraft maneuver included in the plurality of preprogrammed aircraft maneuvers on the memory 236. The controller 234 is configured to direct the auxiliary fan array 222 to change to the corresponding predetermined speed profile in response to detecting the preprogrammed aircraft maneuver. The controller 234 may be configured to use a combination of the pressure measurements and the detected preprogrammed aircraft maneuver to control the rotation speeds of each of the electric fans 226.

Figure 6:
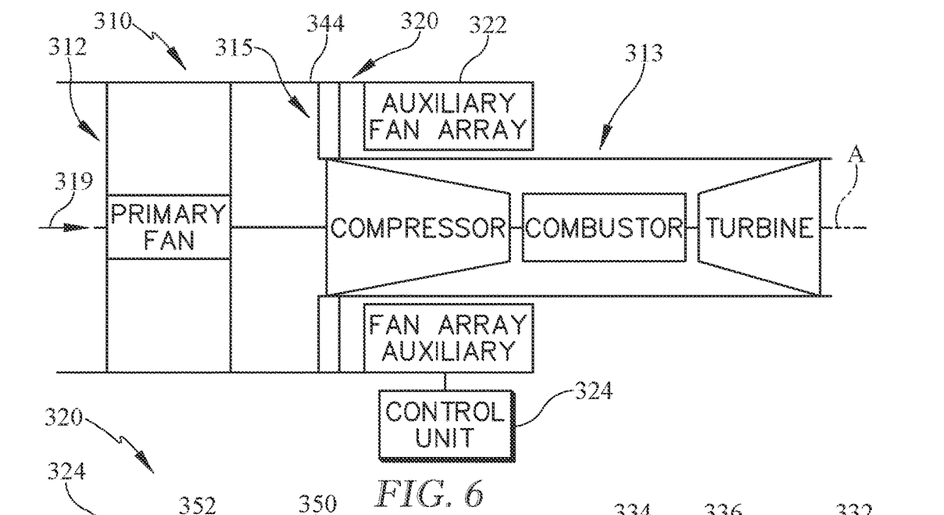
FIG. 6 is a diagrammatic view of another embodiment of an auxiliary fan system in a gas turbine engine showing the auxiliary fan system has an auxiliary fan array located axially aft of the struts included in the gas turbine engine and a control unit coupled to the auxiliary fan array to individually control the rotation speed of each electric fan included in the auxiliary fan array.
Figure 7:
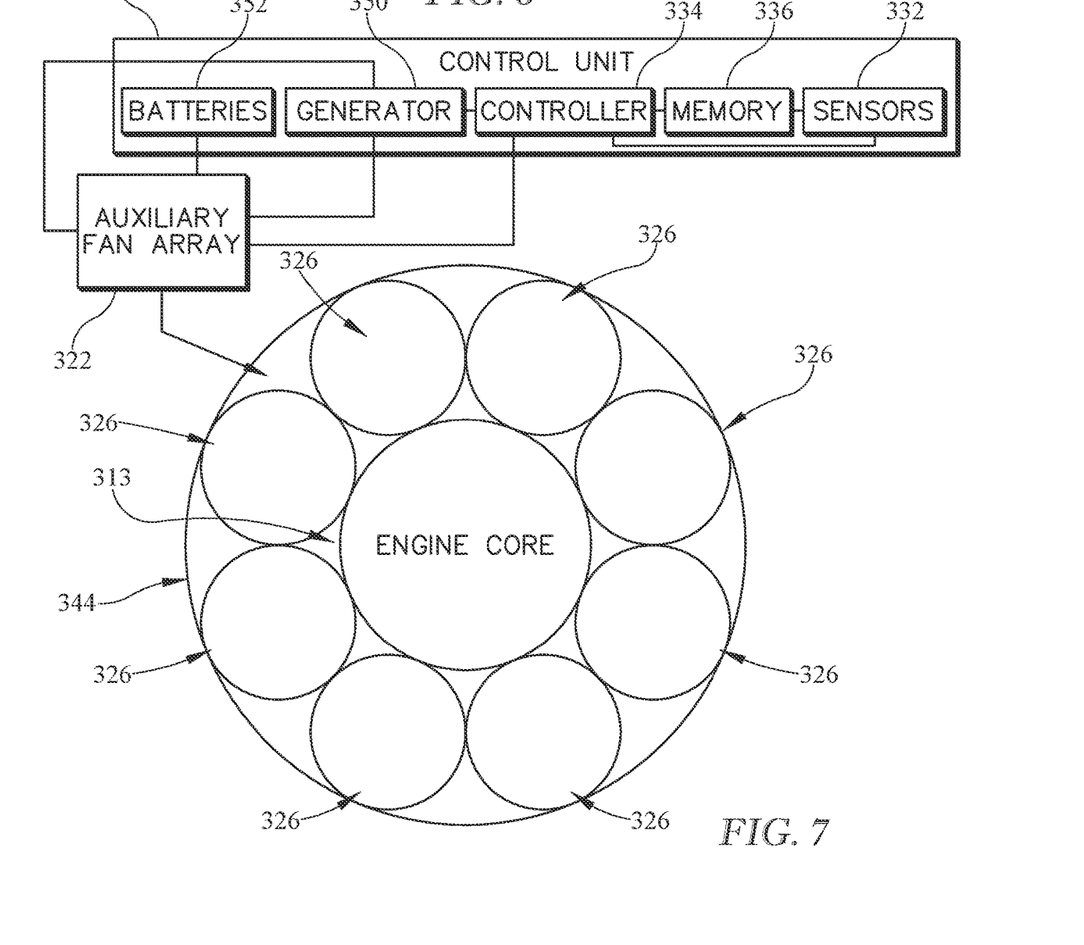
FIG. 7 is a diagrammatic and cross-section view of the gas turbine engine of FIG. 6 showing the auxiliary fan array includes a plurality of electric fans spaced apart around the axis of the gas turbine engine so that the outer electric fans surround an engine core of the gas turbine engine

Another embodiment of an auxiliary fan system 320 in accordance with the present disclosure is shown in FIGS. 6 and 7. The auxiliary fan system 320 is substantially similar to the auxiliary fan systems 20, 220 shown in FIGS. 1-5 and described herein. Accordingly, similar reference numbers in the 300 series indicate features that are common between the auxiliary fan systems 20, 220 and the auxiliary fan system 320. The description of the auxiliary fan systems 20, 220 is incorporated by reference to apply to the auxiliary fan systems 20, 220, except in instances when it conflicts with the specific description and the drawings of the auxiliary fan system 320.

The auxiliary fan system 320 is included in a gas turbine engine 310 as shown in FIG. 6. The gas turbine engine 310 includes a primary fan 312, an engine core 313, and the auxiliary fan system 320. The primary fan 312 is mounted for rotation about an axis A of the gas turbine engine 310 to provide thrust. The engine core 313 is coupled to the primary fan 312 and configured to drive rotation of the primary fan 312 about the axis A to cause the fan 312 to push air to provide thrust for the gas turbine engine 310. The auxiliary fan system 320 is configured to augment the flow of air through the gas turbine engine 310 to help offset and minimize the pressure and swirl distortions in the gas turbine engine 310.

The auxiliary fan system 320 includes an auxiliary fan array 322 and a control unit 324 as shown in FIGS. 6 and 7. The auxiliary fan array 322 is located axially aft of the primary fan 312 and the struts 315 so that the plurality of electric fans 326 are spaced apart circumferentially around the engine core 313. The control unit 324 is coupled to the auxiliary fan array 322 to individually control the rotation speed of each electric fan 326 included in the auxiliary fan array 322 in response to a pressure differential in the flow path 319 of the gas turbine engine 310 upstream of the engine core 313. In the illustrative embodiment, the engine core 313 is arranged radially inward of the outer case 344 to create a bypass duct between the outer case 344 and the engine core 313 as shown in FIG. 6.

The control unit 324 includes a power supply, sensors 332, a controller 334, and a memory 336 as shown in FIG. 7. The power supply is coupled to each of the electric fans 326 to provide power to each of the electric fans 326. The plurality of sensors 332 arranged to measure pressure within the flow path 319 of the gas turbine engine 310 upstream of the engine core 313. The controller 334 is coupled to each of the electric fans 326 and the power supply. The controller 334 is also coupled to the plurality of sensors 332 to receive pressure measurements from the plurality of sensors 332. The memory 336 is coupled to the controller 334 and has a plurality of preprogrammed aircraft maneuvers that each correspond to a predetermined speed profile for the auxiliary fan array 322.

The power supply includes a generator 350 and batteries 352 as shown in FIG. 7. The generator 350 is coupled to the auxiliary fan array 322 to supply power to the auxiliary fan array 322 to drive rotation of the plurality of electric fans 326. The batteries 352 are coupled to the generator 350 to store electricity produced by the generator 350. The batteries 352 are also coupled to the auxiliary fan array 322 to supply power to the auxiliary fan array 322. In the illustrative embodiment, the batteries 352 may supplement the power supplied by the generator 350 to the auxiliary fan array 322 and/or independently supply power to the auxiliary fan array 322.

Based on the pressure measurements and/or the detected preprogrammed aircraft maneuvers, the controller 334 is configured to individually increase, decrease, and/or maintain the speed of each of the electric fans 326. The controller 334 is configured to increase the rotation speed of at least one electric fan 326 included in the auxiliary fan array 322 in response to the pressure measurement from the sensors 332 being above a predetermined threshold. The controller 334 is configured to decrease the rotation speed of at least one electric fan 326 included in the auxiliary fan array 322 in response to the pressure measurement being below the predetermined threshold.

The controller 334 may also be configured to maintain the rotation speed of at least one electric fan 326 included in the auxiliary fan array 322 if the pressure measurements are within the predetermined threshold. Alternatively, the controller 334 may be configured to stop rotation of at least one electric fan 326 included in the auxiliary fan array 322 if the pressure measurements are within the predetermined threshold.

The controller 334 is also configured to detect a preprogrammed aircraft maneuver included in the plurality of preprogrammed aircraft maneuvers on the memory 336. The controller 334 is configured to direct the auxiliary fan array 322 to change to the corresponding predetermined speed profile in response to detecting the preprogrammed aircraft maneuver. The controller 334 may be configured to use a combination of the pressure measurements and the detected preprogrammed aircraft maneuver to control the rotation speeds of each of the electric fans 326.

Figure 8:
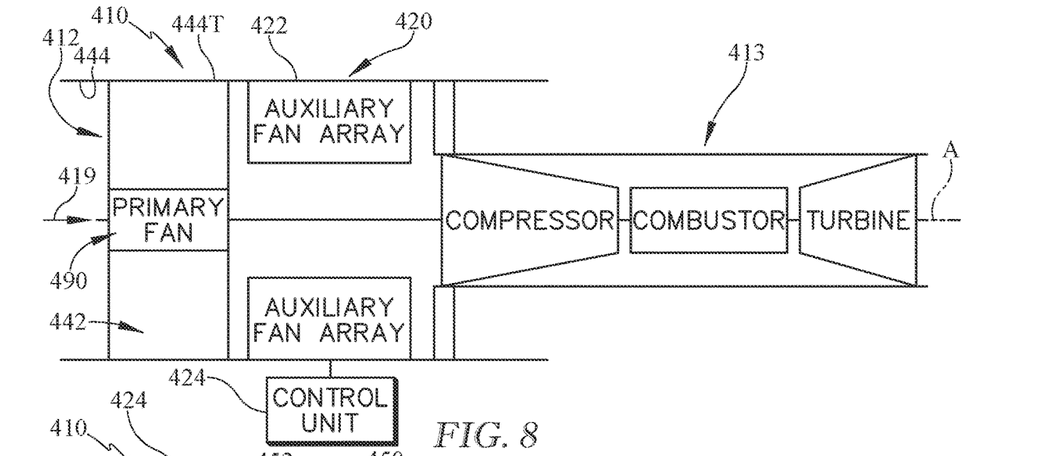
FIG. 8 is a diagrammatic view of another embodiment of an auxiliary fan system in a gas turbine engine showing the auxiliary fan system has an auxiliary fan array located axially aft of the primary fan at or near tips of the fan blades of the primary fan and a control unit coupled to the auxiliary fan array to individually control the rotation speed of each electric fan included in the auxiliary fan array.
Figure 9:
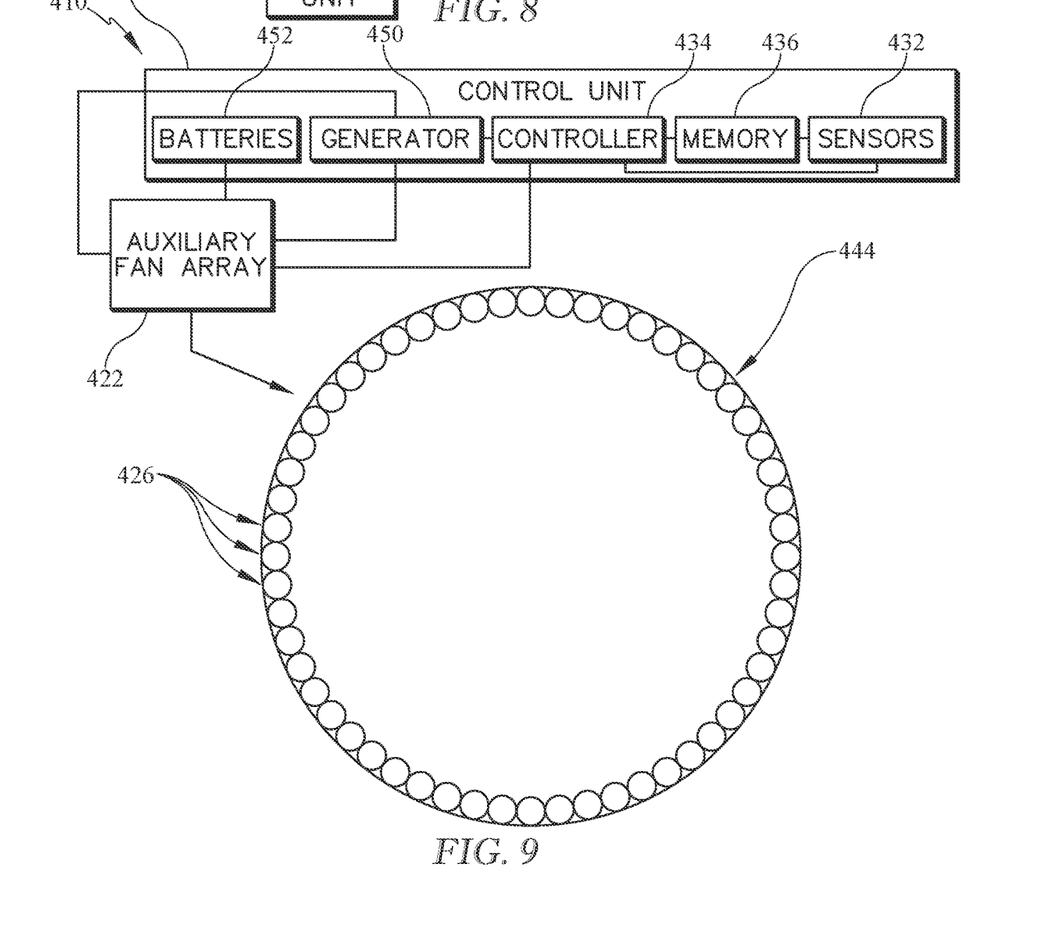
FIG. 9 is a diagrammatic and cross-section view of the gas turbine engine of FIG. 8 showing the auxiliary fan array includes a plurality of electric fans spaced apart around the axis of the gas turbine engine located at or near tips of the fan blades of the primary fan so that the electric fans are arranged around the circumference of the primary fan.

Another embodiment of an auxiliary fan system 420 in accordance with the present disclosure is shown in FIGS. 8 and 9. The auxiliary fan system 420 is substantially similar to the auxiliary fan systems 20, 220 shown in FIGS. 1-5 and described herein. Accordingly, similar reference numbers in the 400 series indicate features that are common between the auxiliary fan systems 20, 220 and the auxiliary fan system 420. The description of the auxiliary fan systems 20, 220 is incorporated by reference to apply to the auxiliary fan systems 20, 220, except in instances when it conflicts with the specific description and the drawings of the auxiliary fan system 420.

The auxiliary fan system 420 is included in a gas turbine engine 410 as shown in FIG. 8. The gas turbine engine 410 includes a primary fan 412, an engine core 413, and the auxiliary fan system 420. The primary fan 412 is mounted for rotation about an axis A of the gas turbine engine 410 to provide thrust. The engine core 413 is coupled to the primary fan 412 and configured to drive rotation of the primary fan 412 about the axis A to cause the fan 412 to push air to provide thrust for the gas turbine engine 410. The auxiliary fan system 420 is configured to augment the flow of air through the gas turbine engine 410 to help offset and minimize the pressure and swirl distortions in the gas turbine engine 410.

The auxiliary fan system 420 includes an auxiliary fan array 422 and a control unit 424 as shown in FIGS. 8 and 9. The auxiliary fan array 422 is located axially aft of the primary fan 412. In the illustrative embodiment, the plurality of electric fans 426 included in the auxiliary fan array 422 are spaced apart circumferentially around the circumference of the primary fan 412 at or near the fan blade tips 442T as shown in FIGS. 8 and 9. The control unit 424 is coupled to the auxiliary fan array 422 to individually control the rotation speed of each electric fan 426 included in the auxiliary fan array 422 in response to a pressure differential in the flow path 419 of the gas turbine engine 410 upstream of the engine core 413.

In the illustrative embodiment, the primary fan 412 includes a fan rotor 440, a plurality of fan blades 442, and the outer case 444 as shown in FIG. 8. The plurality of fan blades 442 each extend radially outward from the fan rotor 440. The outer case 444 extends circumferentially around the axis A of the gas turbine engine 410 radially outward of the fan blades 442 to define a portion of the flow path 419 of the gas turbine engine 410. In the illustrative embodiment, the engine core 413 is arranged radially inward of the outer case 444 to create a bypass duct between the outer case 444 and the engine core 413 as shown in FIG. 9.

In the illustrative embodiment, the plurality of electric fans 426 are located at or near the tips 442T of the fan blades 442 as shown in FIGS. 8 and 9. The electric fans 426 are smaller in diameter compared to the fans 26, 226, 326 in the other embodiments. As pressure and swirl distortions have a greater effect at the tips 442T of the fan blades 442 than at the rotor 440, locating the electric fans 426 at or near the tips 442T of the fan blades 442 may help to better offset and/or minimize the effects of the pressure and swirl distortions.

The control unit 424 includes a power supply, sensors 432, a controller 434, and a memory 436 as shown in FIG. 9. The power supply is coupled to each of the electric fans 426 to provide power to each of the electric fans 426. The plurality of sensors 432 arranged to measure pressure within the flow path 419 of the gas turbine engine 410 upstream of the engine core 413. The controller 434 is coupled to each of the electric fans 426 and the power supply. The controller 434 is also coupled to the plurality of sensors 432 to receive pressure measurements from the plurality of sensors 432. The memory 436 is coupled to the controller 434 and has a plurality of preprogrammed aircraft maneuvers that each correspond to a predetermined speed profile for the auxiliary fan array 422.

The power supply includes a generator 450 and batteries 452 as shown in FIG. 9. The generator 450 is coupled to the auxiliary fan array 422 to supply power to the auxiliary fan array 422 to drive rotation of the plurality of electric fans

426. The batteries 452 are coupled to the generator 450 to store electricity produced by the generator 450. The batteries 452 are also coupled to the auxiliary fan array 422 to supply power to the auxiliary fan array 422. In the illustrative embodiment, the batteries 452 may supplement the power supplied by the generator 450 to the auxiliary fan array 422 and/or independently supply power to the auxiliary fan array 422.

Based on the pressure measurements and/or the detected preprogrammed aircraft maneuvers, the controller 434 is configured to individually increase, decrease, and/or maintain the speed of each of the electric fans 426. The controller 434 is configured to increase the rotation speed of at least one electric fan 426 included in the auxiliary fan array 422 in response to the pressure measurement from the sensors 432 being above a predetermined threshold. The controller 434 is configured to decrease the rotation speed of at least one electric fan 426 included in the auxiliary fan array 422 in response to the pressure measurement being below the predetermined threshold.

The controller 434 may also be configured to maintain the rotation speed of at least one electric fan 426 included in the auxiliary fan array 422 if the pressure measurements are within the predetermined threshold. Alternatively, the controller 434 may be configured to stop rotation of at least one electric fan 426 included in the auxiliary fan array 422 if the pressure measurements are within the predetermined threshold.

The controller 434 is also configured to detect a preprogrammed aircraft maneuver included in the plurality of preprogrammed aircraft maneuvers on the memory 436. The controller 434 is configured to direct the auxiliary fan array 422 to change to the corresponding predetermined speed profile in response to detecting the preprogrammed aircraft maneuver. The controller 434 may be configured to use a combination of the pressure measurements and the detected preprogrammed aircraft maneuver to control the rotation speeds of each of the electric fans 426.

Figure 10:
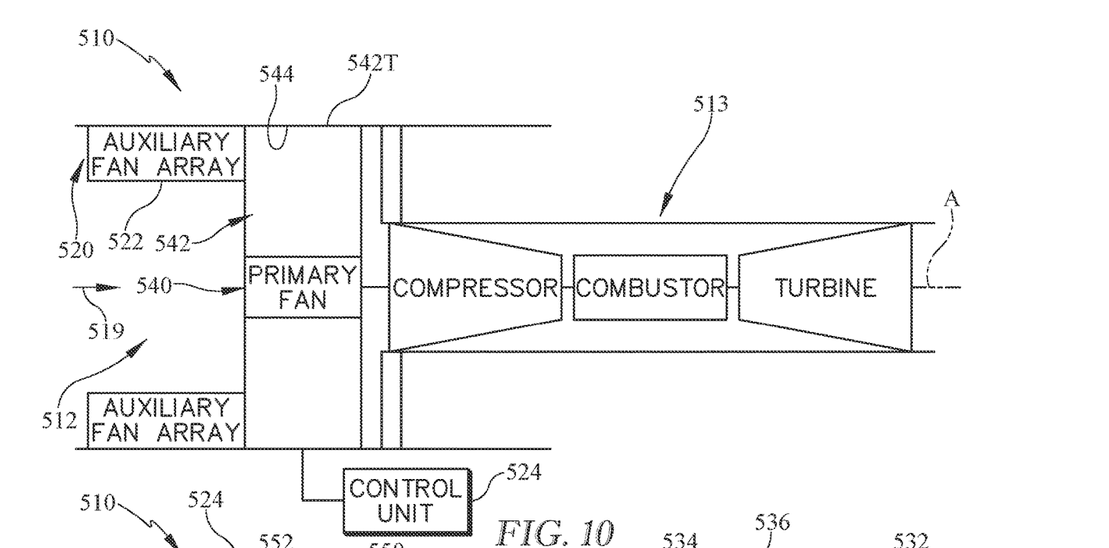
FIG. 10 is a diagrammatic view of another embodiment of an auxiliary fan system in a gas turbine engine showing the auxiliary fan system has an auxiliary fan array located axially forward of the primary fan at or near tips of the fan blades of the primary fan and a control unit coupled to the auxiliary fan array to individually control the rotation speed of each electric fan included in the auxiliary fan array.
Figure 11:
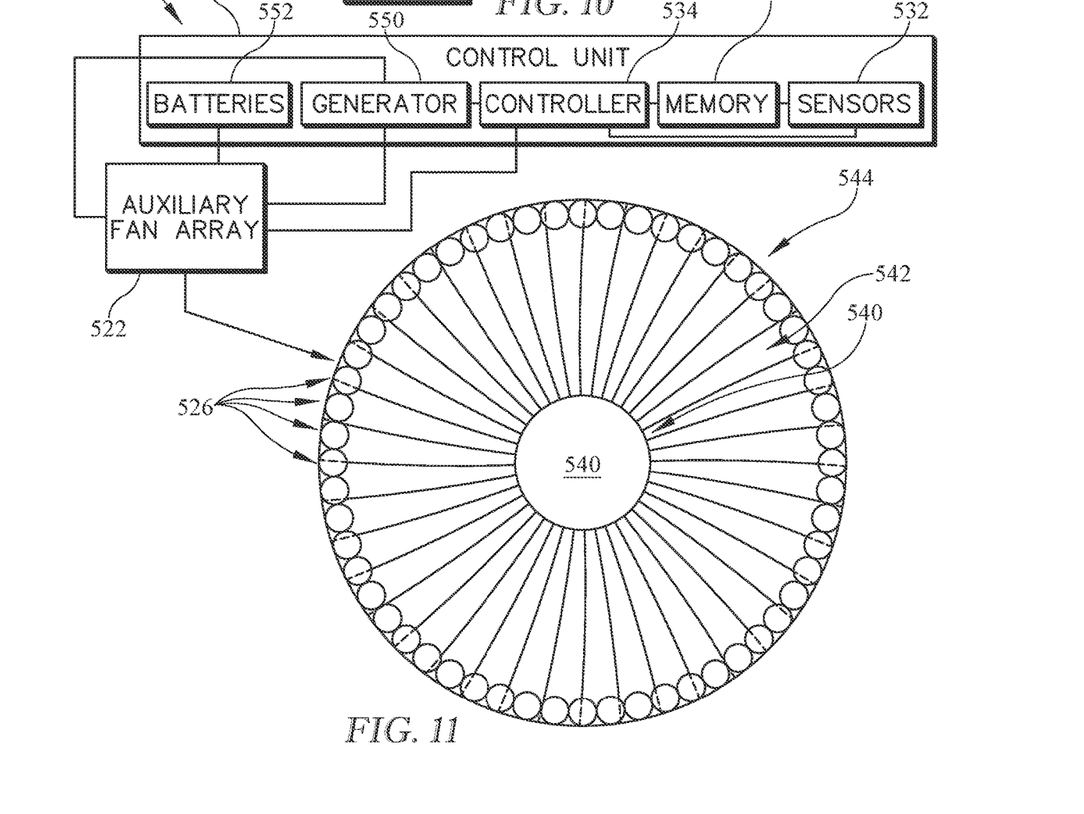
FIG. 11 is a diagrammatic and cross-section view of the gas turbine engine of FIG. 10 showing the auxiliary fan array includes a plurality of electric fans spaced apart around the axis of the gas turbine engine located at or near tips of the fan blades of the primary fan so that the electric fans are arranged around the circumference of the primary fan.

Another embodiment of an auxiliary fan system 520 in accordance with the present disclosure is shown in FIGS. 10 and 11. The auxiliary fan system 520 is substantially similar to the auxiliary fan systems 20, 220, 420 shown in FIGS. 1-5, 8, and 9 and described herein. Accordingly, similar reference numbers in the 500 series indicate features that are common between the auxiliary fan systems 20, 220, 420 and the auxiliary fan system 520. The description of the auxiliary fan systems 20, 220, 420 is incorporated by reference to apply to the auxiliary fan systems 20, 220, 420, except in instances when it conflicts with the specific description and the drawings of the auxiliary fan system 520.

The auxiliary fan system 520 is included in a gas turbine engine 510 as shown in FIG. 10. The gas turbine engine 510 includes a primary fan 512, an engine core 513, and the auxiliary fan system 520. The primary fan 512 is mounted for rotation about an axis A of the gas turbine engine 510 to provide thrust. The engine core 513 is coupled to the primary fan 512 and configured to drive rotation of the primary fan 512 about the axis A to cause the fan 512 to push air to provide thrust for the gas turbine engine 510. The auxiliary fan system 520 is configured to augment the flow of air through the gas turbine engine 510 to help offset and minimize the pressure and swirl distortions in the gas turbine engine 510.

The auxiliary fan system 520 includes an auxiliary fan array 522 and a control unit 524 as shown in FIGS. 10 and 11. The auxiliary fan array 522 is located axially forward of the primary fan 512 as opposed to aft like in the other embodiments. In the illustrative embodiment, the plurality of electric fans 526A, 526B included in the auxiliary fan array 522 are spaced apart circumferentially around the circumference of the primary fan 512 at or near the fan blade tips 542T as shown in FIGS. 10 and 11. The control unit 524 is coupled to the auxiliary fan array 522 to individually control the rotation speed of each electric fan 526 included in the auxiliary fan array 522 in response to a pressure differential in the flow path 519 of the gas turbine engine 510 upstream of the engine core 513.

In the illustrative embodiment, the primary fan 512 includes a fan rotor 540, a plurality of fan blades 542, and the outer case 544 as shown in FIGS. 10 and 11. The plurality of fan blades 542 each extend radially outward from the fan rotor 540. The outer case 544 extends circumferentially around the axis A of the gas turbine engine 510 radially outward of the fan blades 542 to define a portion of the flow path 519 of the gas turbine engine 510. In the illustrative embodiment, the engine core 513 is arranged radially inward of the outer case 544 to create a bypass duct between the outer case 544 and the engine core 513 as shown in FIG. 9.

In the illustrative embodiment, the plurality of electric fans 526 are located at or near the tips 542T of the fan blades 542 as shown in FIGS. 10 and 11. The electric fans 526 are smaller in diameter compared to the fans 26, 226, 326 in the other embodiments and are located axially forward of the primary fan 512. As pressure and swirl distortions have a greater effect at the tips 542T of the fan blades 542 than at the rotor 540, locating the electric fans 526 at or near the tips 542T of the fan blades 542 may help to better offset and/or minimize the effects of the pressure and swirl distortions. The fans 526 of the auxiliary fan system 520 may also be located ahead of the primary fan 512 to help the primary fan 512 survive distortion.

The control unit 524 includes a power supply, sensors 532, a controller 534, and a memory 536 as shown in FIG. 11. The power supply is coupled to each of the electric fans 526 to provide power to each of the electric fans 526. The plurality of sensors 532 arranged to measure pressure within the flow path 519 of the gas turbine engine 510 upstream of the engine core 513. The controller 534 is coupled to each of the electric fans 526 and the power supply. The controller 534 is also coupled to the plurality of sensors 532 to receive pressure measurements from the plurality of sensors 532. The memory 536 is coupled to the controller 534 and has a plurality of preprogrammed aircraft maneuvers that each correspond to a predetermined speed profile for the auxiliary fan array 522.

The power supply includes a generator 550 and batteries 552 as shown in FIG. 11. The generator 550 is coupled to the auxiliary fan array 522 to supply power to the auxiliary fan array 522 to drive rotation of the plurality of electric fans 526. The batteries 552 are coupled to the generator 550 to store electricity produced by the generator 550. The batteries 552 are also coupled to the auxiliary fan array 522 to supply power to the auxiliary fan array 522. In the illustrative embodiment, the batteries 552 may supplement the power supplied by the generator 550 to the auxiliary fan array 522 and/or independently supply power to the auxiliary fan array 522.

Based on the pressure measurements and/or the detected preprogrammed aircraft maneuvers, the controller 534 is configured to individually increase, decrease, and/or maintain the speed of each of the electric fans 526. The controller 534 is configured to increase the rotation speed of at least one electric fan 526 included in the auxiliary fan array 522 in response to the pressure measurement from the sensors 532 being above a predetermined threshold. The controller 534 is configured to decrease the rotation speed of at least one electric fan 526 included in the auxiliary fan array 522 in response to the pressure measurement being below the predetermined threshold.

The controller 534 may also be configured to maintain the rotation speed of at least one electric fan 526 included in the auxiliary fan array 522 if the pressure measurements are within the predetermined threshold. Alternatively, the controller 534 may be configured to stop rotation of at least one electric fan 526 included in the auxiliary fan array 522 if the pressure measurements are within the predetermined threshold.

The controller 534 is also configured to detect a preprogrammed aircraft maneuver included in the plurality of preprogrammed aircraft maneuvers on the memory 536. The controller 534 is configured to direct the auxiliary fan array 522 to change to the corresponding predetermined speed profile in response to detecting the preprogrammed aircraft maneuver. The controller 534 may be configured to use a combination of the pressure measurements and the detected preprogrammed aircraft maneuver to control the rotation speeds of each of the electric fans 526.

Embedded gas turbine engine applications may introduce distortion in the form of pressure gradients and swirl. A fan may need to survive going through different sectors of their circumference with varying level of pressure or swirl magnitudes, which may be difficult to manage for stall or aeromechanical behavior.

In the illustrative embodiment, the gas turbine engine includes an auxiliary fan system 20, 220, 320, 420, 520. The auxiliary fan system 20, 220, 320, 420 may be behind a fan 12, 212, 312, 412. The fans of the auxiliary fan system 20, 220, 320 may be arranged between the frame or intermediate case struts 15, 215, 315. The auxiliary fan system 20, 220, 320, 420, 520 may allow for different speeds to adjust to various flows around the circumference to help offset the pressure and swirl distortions present.

This allows for optimization of response not present with a single fan being embedded (without tip injection/recirculation at least). The fans 526 of the auxiliary fan system 520 may also be located ahead of a traditional fan to help it survive distortion.

The auxiliary fan system 20, 220, 320, 420, 520 allows the primary fan to adapt to or survive in distortion patterns better than with a single fan and even perhaps than some active technologies such as tip injection. The distributed fans may aid the primary fan 12, 212, 312, 412, 512 in normal operation with uniform speed (serves as a bypass booster), but then come into a distortion mitigation regime during maneuvers. In some embodiments, the distributed fans may aid the primary fan 12, 212, 312, 412, 512 during normal operations as well since there may be distorted inlet flow with reduced swirl magnitudes.

The auxiliary fan system 20, 220, 320, 420, 520 may also be acting to mitigate distortion such as with boundary layer ingestion. As the fans 26, 226, 326, 426, 526 use electric motors, the fans 26, 226, 326, 426, 526 may be at different speeds and respond nearly instantaneously, as compared to mechanical gear/driveshaft configurations, which may have to be at the same speed and would be challenging to infinitely tune their relationship without complexity of continuously variable transmissions.

Even still, there remains value beyond an embedded or boundary layer injection application. A hybrid configuration such as this with bypass boosters may potentially act as a higher bypass ratio fan if the main primary forward fan is driven at low speeds (high enough just to load a low pressure generator) and then the bypass fans are operating at high speed. The flow through the core may be minimal, so this may represent a high bypass ratio—without the need for a gear located to the fan—and more variable to suit different missions.

In other embodiments, aircrafts with mechanical fans may rely on inlet guide fanes/full inlet frames to help process incoming distortion and swirl. An off-the-shelf turbofan without such in an embedded application may struggle with distortion and swirl which would not allow an airframe to use its full envelope as intended. In response to the distortion, one may try to mitigate the distortion or try to somehow survive the distortion.

Tools, such as flow control or fins/vortex generators or plasma generators in the inlet, may limit the influence of distortion remaining before the distortion arrives at the fan. Fans with mistuning, improved damping, casing treatments, tip injection, or mechanical design tailored for distortion may empower the fan to be able to handle distortion. Imposing a keep out zone is also a way to respond to distortion. However, with the rise of electrical and hybrid configurations that provide additional architecture options, distributed fans may be included inside a turbofan assembly to replace or augment the traditional fan to respond to distortion by varying individual fan speed to offset the distortion being experienced.

By nature, a single spinning fan may be axisymmetric as the fan faces non-axisymmetric distortions. These may have pockets of low pressure or local swirl vortices, or patterns of pressure that may create forcing on the aerofoil, which may lead to failure. Making a fan robust to these different inputs may be challenging, but if it is not made robust to distortion then its usefulness may be limited by having to avoid maneuvers or not be capable of the full intended envelope Instead, the illustrative embodiments use smaller distributed fans 26, 226, 326, 426, 526 to increase velocity around the circumference locally and offset the distortion. In the illustrative embodiment, the control unit 24, 224, 324, 424, 524 includes sensors and/or control logic to adjust the auxiliary fan array 22, 222, 322, 422, 522 on the fly to different conditions or in anticipation of maneuvers/inputs/programming. This may allow the primary fan 12, 212, 312, 412 to potentially be simpler (less tailoring of the fan to distortion or elimination of tip injection or mistuning) with support of the distributed fans 26, 226, 326, 426, 526 to aid in overcoming distortion.

The turbofan may drive a generator, which then powers the small electric fans of the auxiliary fan array 22, 222, 322, 422, 522. This may be beneficial in applications where the arrangements of fans may take the shape of the airframe rather than enforcing a large cylinder within the body. In other embodiments, a second gas turbine engine or turboshaft may power the generator 50 or another generator coupled to the auxiliary fan system 20, 220, 320, 420, 520.

In small to medium thrust class applications, the electric fans 26 may be installed between the struts 15 as shown in FIGS. 2 and 3. The fans 26 included in the auxiliary fan array 22 may be installed between the struts 15 in order to offset distortion by increasing flow through a particular sector of the circumference.

In the illustrative embodiment, the array 22 includes 18-off 5.25 inch diameter fans 26. In other embodiments, about 5 inch diameter fans 26 may be used. In other embodiments, about 6 inch diameter fans 26 may be used. In other embodiments, any suitable fan size may be used to fit the electric fans 26 between adjacent struts 15.

The areas between the fans 26 and the inner and outer flow paths may be filled to maximize the influence of the auxiliary fans 26. In other embodiments, the areas between the fans 26 and the inner and outer flow paths may be open to maximum flow within the system. The distributed fans 26 may be powered by an embedded generator 50 like as shown in FIGS. 1-3. The space between the core 13 and the inner bypass flow path may house a large amount of wires and other supporting infrastructure and controls hardware. These would be located aft of non-structural outlet guide vanes.

The electric fans 26 may also help to reduce the difference between optimal design of the fan for take-off power and the best for cruise efficiency by providing auxiliary flow and thrust compared to not having these distributed fans or bypass boosters in place. Depending on the design of the engine, the fans 26 may also be used for reverse thrust if the fan 12 went to idle/windmill and the fans 26 were put into full reverse, either just in direction or by variable pitch.

It may be desirable to have booster fans 26 only on the top or bottom portion of the circumference in a boundary layer ingestion application, where one half of the fan sees repeatedly higher or isolated distortions. Similarly, if the cruise thrust requirements were low, then potentially the primary fan 12 may be put into windmill or very low thrust at a speed just high enough to spin the generator 50 to make power to turn the distributed fans 26. This may translate to a large bypass ratio as little flow through the core 13 may be needed at such a low pressure/core speed. As the frame or intermediate case has to have struts 15 like as shown in FIG. 3, locating the distortion fans 26 between the struts 15 may be desirable as the struts already hinder flow somewhat. The fans 26 may help overcome hindered flow as well as helping augment thrust and be able to adapt to distortion flows.

As shown in FIGS. 6 and 7, the fans 326 of the auxiliary fan array 322 may be located downstream of the intermediate case, i.e. the struts 315, between the bypass duct outer flow path and the core 13 of the engine 10. The auxiliary fan array 322 may be located axially aft of the struts 315 such as around the high pressure compressor portion like as shown in FIG. 6. This region may be filled with externals and ducts, so implementation of fans 326 driving flow and trying to overcome non-axisymmetric distortion patterns may help. Structures in the bypass duct may hinder fan performance so by using augmenting fans 326 there, flows may be made more uniform aft of the fan 312 and outlet guide vanes 315, as well as help to offset distortion from the inlet. The auxiliary fan array 322 may be used behind non-structural outlet guide vanes and the intermediate case or frame struts, or behind structural outlet guide vanes within the intermediate case.

While the distortion control fans 326 may be the full span between the engine core 313 and bypass duct outer portion, the fans 326 may also be smaller and around the outer case, for example. For example, the fans 326 may be used near the opening to the core duct of the engine core 313. Use of the fans 326 may also find synergies with a variable area nozzle to adapt to different mission points and yield efficiency benefits.

The fans 326 may be near the aft end of the bypass duct and may even be integrated into the exhaust/nozzle. Such an arrangement may bring benefits such as improved mixing, including bringing in cold air to mix with core flows to reduce heat signature potentially. Between the bypass boosters reducing core flow needs and this mixing, cruise may have lower temperature output. Another potential use may be to use such fans 326 to better mix core and bypass streams to reduce noise of shearing.

The electric fans 26, 226, 326, 426, 526 may be powered by an embedded generator 50, 250, 350, 450, 550 and may be aided by a capacitor or battery 52, 252, 352, 452, 552 for short boosts (take-off, adverse situations) instead of continuous power such as during climb. In some embodiments, the auxiliary fan system 20, 220, 320, 420, 520 may enable shorter take-offs.

The primary fan 12, 212, 312, 412, 512 may be optimized for cruise and then the distributed fans 26, 226, 326, 426, 526 may operate primarily to augment power in take-off, or mitigating distortion as needed. In other embodiments, the fans 26, 226, 326, 426, 526 may be powered by a separate gas turbine turboshaft engine and generator elsewhere in the aircraft, or by other similar means—which could be more flexible for airframe integration and configuration.

With distributed fans, it may also be possible to move away from a circular cross-section as in a typical single fan configuration. The benefits of an array to vary speed between the locations to respond to distortion is still feasible with non-circular arrays. The array may be modified to suit a partial airframe shape or be optimized for a particular inlet design.

In some embodiments, the fans 26 may be able to tilt or change angle in a holder (like a spherical bearing) with an actuator or similar. In this way, the tilting fans 26 may work to mitigate swirl or allow for more active tailoring of distortion response. This might be easiest to implement and be effective aft of the fan 12 in the bypass/front frame. These could be effectively used like a matched outlet guide vane system, used in place or combined with a matched or variable outlet guide vane setup.

In other embodiments, the array of fans 22, 222, 322, 422, 522 around the circumference may be used to produce a traveling wave pattern that may be used to break up modes of the fan blisk or aerodynamically mistune it for flutter. This may be done passively (constantly doing) or actively (triggered by blade vibration). As the fan blisk travels, the smaller fans 26, 226, 326, 426, 526 may pulse in a pattern to disrupt other vibrations or responses—such as in A/B configuration going fast/slow. In other embodiments, the auxiliary fan array 22, 222, 322, 422, 522 may be arranged in-front of or behind the primary fan 12, 212, 312, 412, 512 to help a damaged aerofoil by following it around at the rotational speed of the blisk to offset loading on it.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a primary fan mounted for rotation about an axis of the gas turbine engine to provide thrust, the primary fan including a fan rotor, a plurality of fan blades that extend radially outward from the fan rotor, and an outer case that extend circumferentially around the axis of the gas turbine engine radially outward of the plurality of fan blades to define a portion of a flow path of the gas turbine engine,
an engine core coupled to the primary fan and configured to drive the primary fan about the axis to cause the primary fan to push air to provide thrust for the gas turbine engine, the engine core including a compressor configured to rotate about the axis of the gas turbine engine to compress the air that flows from the primary fan, a combustor configured to receive the compressed air from the compressor, and a turbine coupled to the compressor and the primary fan and configured to rotate about the axis of the gas turbine engine in response to receiving hot, high-pressure products of the combustor to drive rotation of the compressor and the primary fan, and an auxiliary fan system including an auxiliary fan array located radially inward of the outer case and located axially forward or aft of the primary fan and a control unit coupled to the auxiliary fan array, the auxiliary fan array having a plurality of electric fans spaced apart around the axis of the gas turbine engine that are each configured to rotate about a fan axis, and the control unit configured to vary individually a rotation speed of each electric fan included in the auxiliary fan array in response to a pressure differential in the flow path of the gas turbine engine upstream of the engine core to minimize pressure and swirl distortions in the gas turbine engine.

2. The gas turbine engine of claim 1, wherein the control unit includes a plurality of sensors arranged to measure pressure within the flow path of the gas turbine engine upstream of the engine core and a controller coupled to the plurality of sensors to receive pressure measurements from the plurality of sensors, the controller configured to increase the rotation speed of at least one electric fan included in the auxiliary fan array in response to the pressure measurement being above a predetermined threshold.

3. The gas turbine engine of claim 2, wherein the controller is configured to decrease the rotation speed of at least one electric fan included in the auxiliary fan array in response to the pressure measurement being below the predetermined threshold.

4. The gas turbine engine of claim 3, wherein the control unit further includes a memory coupled to the controller, the memory including a plurality of preprogrammed aircraft maneuvers that each correspond to a predetermined speed profile for the auxiliary fan array, and the controller is configured to detect a preprogrammed aircraft maneuver included in the plurality of preprogrammed aircraft maneuvers on the memory and direct the auxiliary fan array to change to the corresponding predetermined speed profile in response to detecting the preprogrammed aircraft maneuver.

5. The gas turbine engine of claim 3, wherein the plurality of electric fans are each configured to pivot relative to the outer case of the primary fan and the controller is configured to direct at least one electric fan included in the plurality of electric fans to pivot in response to the pressure measurements from the plurality of sensors.

6. The gas turbine engine of claim 1, wherein the control unit includes a controller and a memory coupled to the controller, the memory including a plurality of preprogrammed aircraft maneuvers that each correspond to a predetermined speed profile for the auxiliary fan array, and the controller configured to detect a preprogrammed aircraft maneuver included in the plurality of preprogrammed aircraft maneuvers on the memory and direct the auxiliary fan array to change to the corresponding predetermined speed profile in response to detecting the preprogrammed aircraft maneuver.

7. The gas turbine engine of claim 6, wherein the plurality of electric fans are each configured to pivot relative to the outer case of the primary fan and the controller is configured to direct at least one electric fan included in the plurality of electric fans to pivot in response to detecting the preprogrammed aircraft maneuver.

8. The gas turbine engine of claim 1, further comprising a plurality of struts that each extend between the outer case of the primary fan and the engine core and are spaced apart circumferentially around the axis, and wherein the auxiliary fan array is located axially aft of the primary fan and two or more electric fans included in the auxiliary fan array are arranged circumferentially between adjacent struts.

9. The gas turbine engine of claim 8, wherein the auxiliary fan array is located axially aft of the plurality of struts.

10. The gas turbine engine of claim 8, wherein the plurality of electric fans included in the auxiliary fan array are arranged around the engine core so that each electric fan included in the plurality of electric fans is located radially between the outer case and the engine core.

11. A gas turbine engine comprising
a primary fan mounted for rotation about an axis of the gas turbine engine to provide thrust,
an engine core coupled to the primary fan and configured to drive the primary fan about the axis, and
an auxiliary fan system including an auxiliary fan array located axially forward or aft of the primary fan and a control unit coupled to the auxiliary fan array, the auxiliary fan array having a plurality of electric fans spaced apart around the axis of the gas turbine engine that are each configured to rotate about a fan axis, and the control unit configured to vary individually a rotation speed of each electric fan included in the auxiliary fan array in response to a pressure differential in a flow path of the gas turbine engine upstream of the engine core.

12. The gas turbine engine of claim 11, wherein the control unit includes a plurality of sensors arranged to measure pressure within the flow path of the gas turbine engine upstream of the engine core and a controller coupled to the plurality of sensors to receive pressure measurements from the plurality of sensors, the controller configured to increase the rotation speed of at least one electric fan included in the auxiliary fan array in response to the pressure measurement being above a predetermined threshold and to decrease the rotation speed of at least one electric fan included in the auxiliary fan array in response to the pressure measurement being below the predetermined threshold.

13. The gas turbine engine of claim 12, wherein the plurality of electric fans are each configured to pivot relative to the primary fan and the controller is configured to direct at least one electric fan included in the plurality of electric fans to pivot in response to the pressure measurements from the plurality of sensors.

14. The gas turbine engine of claim 11, wherein the control unit includes a controller and a memory coupled to the controller, the memory including a plurality of preprogrammed aircraft maneuvers that each correspond to a predetermined speed profile for the auxiliary fan array, and the controller configured to detect a preprogrammed aircraft maneuver included in the plurality of preprogrammed aircraft maneuvers on the memory and direct the auxiliary fan array to change to the corresponding predetermined speed profile in response to detecting the preprogrammed aircraft maneuver.

15. The gas turbine engine of claim 14, wherein the plurality of electric fans are each configured to pivot relative to the primary fan and the controller is configured to direct at least one electric fan included in the plurality of electric fans to pivot in response to detecting the preprogrammed aircraft maneuver.

16. The gas turbine engine of claim 11, further comprising an outer case arranged to extend around the primary fan, the engine core, and the auxiliary fan array and a plurality of struts that each extend between the outer case and the engine core and are spaced apart circumferentially around the axis, wherein the auxiliary fan array is located axially aft of the primary fan and two or more electric fans included in the auxiliary fan array are arranged circumferentially between adjacent struts.

17. The gas turbine engine of claim 16, wherein the auxiliary fan array is located axially aft of the plurality of struts.

18. The gas turbine engine of claim 11, wherein the plurality of electric fans included in the auxiliary fan array are arranged around the engine core axially aft of an inlet to the engine core.

19. A method comprising
providing a gas turbine engine comprising a primary fan mounted for rotation about an axis to provide thrust, an engine core coupled to the primary fan and configured to drive the primary fan about the axis, and an auxiliary fan system, the auxiliary fan system including an auxiliary fan array located axially forward or aft of the primary fan having a plurality of electric fans spaced apart around the axis that are each configured to rotate about a fan axis,
conducting a flow of air through a flow path of the gas turbine engine,
measuring pressure of the flow of air in the flow path of the gas turbine engine axially forward of the engine core, and
varying a rotation speed of at least one electric fan included in the auxiliary fan array in response to the pressure measurements being above or below a predetermined threshold to minimize pressure and swirl distortions in the gas turbine engine.

20. The method of claim 19, further comprising pivoting at least one electric fan included in the auxiliary fan array relative to the primary fan to change a direction of the at least one electric fan in response to the pressure measurements.

* * * * *